United States Patent
Dornstetter et al.

(10) Patent No.: US 6,850,562 B1
(45) Date of Patent: Feb. 1, 2005

(54) DIGITAL EQUALIZING METHOD AND RADIO COMMUNICATION RECEIVER IMPLEMENTING SAID METHOD

(75) Inventors: Jean-Louis Dornstetter, Plaisir (FR); Nidham Ben Rached, Paris (FR); Corinne Bonhomme, Chessy (FR)

(73) Assignee: Nortel Networks S.A. (FR)

( * ) Notice: Subject to any disclaimer, the term of this patent is extended or adjusted under 35 U.S.C. 154(b) by 0 days.

(21) Appl. No.: 09/763,934
(22) PCT Filed: Sep. 2, 1999
(86) PCT No.: PCT/FR99/02089
§ 371 (c)(1), (2), (4) Date: Jul. 26, 2001
(87) PCT Pub. No.: WO00/14936
PCT Pub. Date: Mar. 16, 2000

(30) Foreign Application Priority Data

Sep. 4, 1998 (FR) .............................. 98 11095
Oct. 7, 1998 (FR) .............................. 98 12552

(51) Int. Cl.⁷ .............................................. H03H 7/30
(52) U.S. Cl. ...................... 375/229; 375/340; 708/323
(58) Field of Search ................................ 375/229, 230, 375/231, 232, 233, 234, 235, 236, 262, 316, 340, 341; 708/319, 322, 323; 333/28 R

(56) References Cited

U.S. PATENT DOCUMENTS

| 4,484,338 A | 11/1984 | Clark | 375/341 |
|---|---|---|---|
| 4,701,936 A | 10/1987 | Clark | 375/232 |
| 5,293,401 A | * 3/1994 | Serfaty | 375/231 |
| 5,533,063 A | * 7/1996 | Mitra et al. | 375/340 |
| 6,608,862 B1 | * 8/2003 | Zangi et al. | 375/232 |

OTHER PUBLICATIONS

Batteman, et al., <<Comparison of Algorithms for use in Adaptive Adjustment of Digital Data Receivers>>, IEE Proceedings I. Solid–State & Electron Devices, Apr. 1, 1990, vol. 137, No. 2, Part 01, pp. 85–96.

* cited by examiner

*Primary Examiner*—Chieh M. Fan
(74) *Attorney, Agent, or Firm*—Peter Rudnick LLP

(57) ABSTRACT

For processing samples of a signal received via a channel represented by an impulse response of W–1 coefficients, the method comprises: determining the W roots of the Z-transform of the channel impulse response; producing an intermediate signal by equalizing the received signal by a zero-forcing method or the like based on an impulse response whose Z-transform is a $Z^{-1}$ polynomial of degree W-p having as roots those of the W roots which are furthest from the unit circle of the complex plane; and then obtaining estimations of the transmitted signal symbols by applying a Viterbi-type equalization method or the like based on an impulse response whose Z-transform is a $Z_{-1}$ polynomial of degree p having as roots those of the W roots which are nearest to the unit circle.

8 Claims, 2 Drawing Sheets

DIGITAL EQUALIZING METHOD AND RADIO COMMUNICATION RECEIVER IMPLEMENTING SAID METHOD

BACKGROUND OF THE INVENTION

The invention concerns the digital equalization of signals. It has important applications in the field of radio communications.

The method is applied to the processing of a signal received from a transmitter over a channel between transmitter and receiver, whose response is known or has been estimated beforehand. One of the main issues is then that of the compromise between the performance of the equalizer and its complexity.

A complete maximum likelihood estimation of the transmitted signal is possible, for example by employing the Viterbi algorithm (see G. D. Forney Jr.: *The Viterbi Algorithm*, Proc. of the IEEE, Vol. 61, No. 3, March 1973, pages 268–278). Nevertheless, as soon as the impulse response of the channels becomes long or the number of possible discrete values becomes large, the exponentially increasing complexity of these methods renders them impracticable.

We consider the case of a radio communications channel used for the transmission of a signal composed of successive sequences or frames of n symbols, $d_k$ ($1 \leq k \leq n$). The symbols $d_k$ have discrete values: binary ($\pm 1$) in the case of a BPSK (binary phase shift keying) modulation; quaternary ($\pm 1 + j$) in the case of a QPSK (quaternary phase shift keying) modulation.

After baseband conversion, digitization and matched filtering, a vector Y of the received signal, corresponding to the symbols transmitted over the duration of a frame, is defined by the expression $$Y = \begin{pmatrix} y_1 \\ y_2 \\ \vdots \\ \\ y_k \\ \\ \vdots \\ \\ y_L \end{pmatrix} = \begin{pmatrix} r_0 & 0 & 0 & \cdots & 0 \\ r_1 & r_0 & 0 & & \vdots \\ & r_1 & r_0 & \ddots & 0 \\ \vdots & & r_1 & \ddots & 0 \\ & \vdots & & \ddots & r_0 \\ r_w & & \vdots & & r_1 \\ 0 & r_w & & & \\ 0 & 0 & r_w & & \vdots \\ \vdots & & \ddots & \ddots & \\ 0 & \cdots & 0 & 0 & r_W \end{pmatrix} \begin{pmatrix} d_1 \\ d_2 \\ \vdots \\ \\ d_k \\ \\ \vdots \\ \\ d_n \end{pmatrix} + \begin{pmatrix} y_{N,1} \\ y_{N,2} \\ \vdots \\ \\ y_{N,k} \\ \\ \vdots \\ \\ y_{N,L} \end{pmatrix} = A.D + Y_N \quad (1)$$

where W+1 is the length in numbers of bits of the estimated impulse response of the channel, $r=(r_0, r_1, \ldots, r_w)$ is the estimated impulse response of the channel, the $r_q$ being complex numbers such that $r_q=0$ for $q<0$ or $q>W$, $Y_k$ is the k-th complex sample received with $1 \leq k \leq L=n+W$, and $Y_N$ is a vector of dimension L composed of samples of additive noise $y_{N,k}$. The estimated impulse response r takes into account the propagation channel, the signal shaping by the transmitter and the receiver filtering.

The matrix A of dimension L×n has a Toeplitz-type structure, meaning that if $\alpha_{i,j}$ denotes the term in the i-th row and in the j-th column of the matrix A, then $\alpha_{i+1,j+1}=\alpha_{i,j}$ for $1 \leq i \leq L-1$ and $1 \leq j \leq n-1$. The terms of the matrix A are given by: $\alpha_{1,j}=0$ for $1<j \leq n$ (A therefore has only zeros above its principal diagonal); $\alpha_{i,1}=0$ for $W+1>i \leq L$ (band-matrix structure); and $\alpha_{i,1}=r_{i-1}$, for $1 \leq i \leq W+1$.

The matrix equation (1) expresses the fact that the signal received Y is an observation, with an additive noise, of the convolution product between the channel impulse response and the transmitted symbols. This convolution product can also be expressed by its Z-transform:

$$Y(Z)=R(Z).D(Z)+Y_N(Z) \quad (2)$$

where D(Z), Y(Z), R(Z) and $Y_N(Z)$ are the Z-transforms of the transmitted symbols, of the received signal, of the impulse response and of the noise, respectively:

$$D(Z) = \sum_{k=1}^{n} d_k \cdot Z^{-k} \quad (3)$$

$$Y(Z) = \sum_{k=1}^{L} y_k \cdot Z^{-k} \quad (4)$$

$$R(Z) = \sum_{q=0}^{W} r_q \cdot Z^{-q} \quad (5)$$

A conventional solution to solve a system such as (1) is the so-called "zero forcing" method, by which we determine the vector $\hat{D}_{ZF}$ of n continuous components which minimizes the quadratic error $\epsilon=\|A\hat{D}-Y\|^2$. Subsequently, a discretization of the components of vector $\hat{D}_{ZF}$ relating to each channel is performed, often through a channel decoder. The least-squares solution $\hat{D}_{ZF}$ is given by $\hat{D}_{ZF}=(A^H A)^{-1} A^H Y$, where $A^H$ denotes the conjugate transpose of matrix A. We then are faced with the problem of inverting the Hermitian positive matrix ALA. The inversion can be effected by various classical algorithms, either directly (method of Gauss, Cholesky, etc.) or by an iterative technique (Gauss-Seidel algorithm, gradient algorithm, etc.).

The estimation error $D-\hat{D}_{ZF}$ is equal to $(A^H A)^{-1} A^H Y_N$, hence the solution includes noise with a variance:

$$\sigma^2 = E(\|D-\hat{D}_{ZF}\|^2) = N_0 \times \text{Trace}[(A^H A)^{-1}] \quad (6)$$

where $N_0$ is the noise power spectral density. It can be seen that noise enhancement occurs when the matrix $A_H A$ is badly conditioned, i.e. when it has one or more eigenvalues close to zero.

This noise enhancement is the main drawback of the conventional solution methods. In practice, the cases where the matrix $A^H A$ is badly conditioned are frequent, especially with multiple propagation paths.

A relatively simple means to partly remedy this drawback is known, by accepting residual interference in the solution, i.e. by not adopting the optimum least-squares solution, but the solution: $D_{MMSE}=(A^H A+\hat{N}_0)^{-A^H} Y$, where $\hat{N}_0$ denotes an estimation of the noise spectral density, that the receiver must then calculate. This is known as the MMSE (minimum mean square error) method and it allows the estimation variance to be reduced relative to the zero-forcing method, but introduces a bias.

The zero forcing methods and the like amount to performing an inverse filtering on the signal received by a filter which models the transfer function 1/R(Z) calculated using a certain approximation (quadratic in the case of zero forcing). Where one or more roots of the polynomial R(Z) (equation (5)) are situated on the unit circle, the theoretical inverse filter presents singularities rendering it impossible to estimate by a satisfactory approximation. In the case of the quadratic approximation, this corresponds to a divergence in the error variance $\sigma^2$ when the matrix $A^H A$ has an eigenvalue equal to zero (relation (6)).

This problem does not arise in methods such as the Viterbi algorithm which intrinsically take the discrete nature of the symbols into account, but which require a much higher calculating power for large-sized systems.

U.S. Pat. No. 4,701,936 discloses a channel equalizer using an all-pass filter determined with reference to the Z-transform of the estimated channel impulse response.

An object of the present invention is to propose an equalization method achieving a good compromise between the reliability of the estimations and the complexity of the equalizer.

Another object is to produce an equalizer requiring a reasonable calculating power but capable of processing, with performance comparable to that of Viterbi equalizers, signals whose symbols have a relatively high number of states and/or signals carried on a channel with a relatively log impulse response.

SUMMARY OF THE INVENTION

Accordingly, the invention proposes a digital equalization method for estimating discrete information symbols from digital samples of a signal received over a transmission channel represented by a finite impulse response of W+1 coefficients, W being an integer greater than 1. This method comprises the steps of:

determining the W roots in the complex plane of the Z-transform of the impulse response;

distributing the W roots into a first set of W-p roots and a second set of p roots, p being an integer greater than 0 and smaller than W, the roots of the second set being closer to the unit circle than those of the first set according to a determined distance criterion in the complex plane;

obtaining an intermediate signal by applying a first equalization method to the received signal based on a finite impulse response whose Z-transform, formed by a polynomial of degree W-p in $Z^{-1}$, has roots which are the W-p roots of the first set; and obtaining estimations of the discrete information symbols by applying a second equalization method to the intermediate signal based on a finite impulse response whose Z-transform, formed by a polynomial of degree p in $Z^{-1}$, has roots which are the p roots of the second set.

The "first equalisation method" will usually be chosen so as to treat the unknown symbols as continuous variables. This leads to a process similar to an inverse filtering whose transfer function would have a form approaching the expression $1/RS(Z)$, where $R^S(Z)$ denotes the polynomial in $Z^{-1}$ of order W-p having roots that are the W-p roots furthest from the unit circle in the complex plane. In particular, it could be of the "zero-forcing" type. This process generates only a small enhancement of the noise, since the roots of the associated transfer function in Z are relatively far from the unit circle.

For the p roots which are closest to the unit circle, we adopt measures to avoid or to limit the incidence of the noise enhancement problem. A MMSE or similar method can be chosen as the "second equalization method". However, this second method will advantageous take into account the discrete nature of the unknown symbols. In particular, it may rely on a trellis algorithm, such as the Viterbi algorithm, whose implementation is common in channel equalizers where the system size is not too big.

The implementation of the second equalization method is generally more complex than the first. In each particular case, the choice of the number p allows the best compromise between the reliability of the estimations, which favors higher values of p, and the complexity of the equalizer, which favors lower values of p.

Another aspect of the present invention relates to a radio communications receiver comprising conversion means to produce digital samples from a radio signal received over a transmission channel represented by a finite impulse response of W+1 coefficients, w being an integer greater than 1;

means for measuring the channel impulse response;

means for calculating the W roots in the complex plane of the Z-transform of the impulse response;

means for distributing the W roots into a first set of W-p roots and a second set of p roots, p being an integer greater than 0 and smaller than W, the roots of the second set being closer to the unit circle than those of the first set according to a determined distance criterion in the complex plane;

a first equalization stage for producing an intermediate signal by applying a first equalization method to the received signal based on a finite impulse response whose Z transform, formed by a polynomial of degree W-p in $Z^{-1}$, has roots which are the W-p roots of the first set; and a second equalization stage for producing estimations of the discrete symbols of a signal carried on the channel by applying a second equalization method to the intermediate signal based on a finite impulse response whose Z transform ($R'(Z)$), formed by a polynomial of degree p in $Z^{-1}$, has roots which are the p roots of the second set.

DESCRIPTION OF PREFERRED EMBODIMENTS

Figure 1:
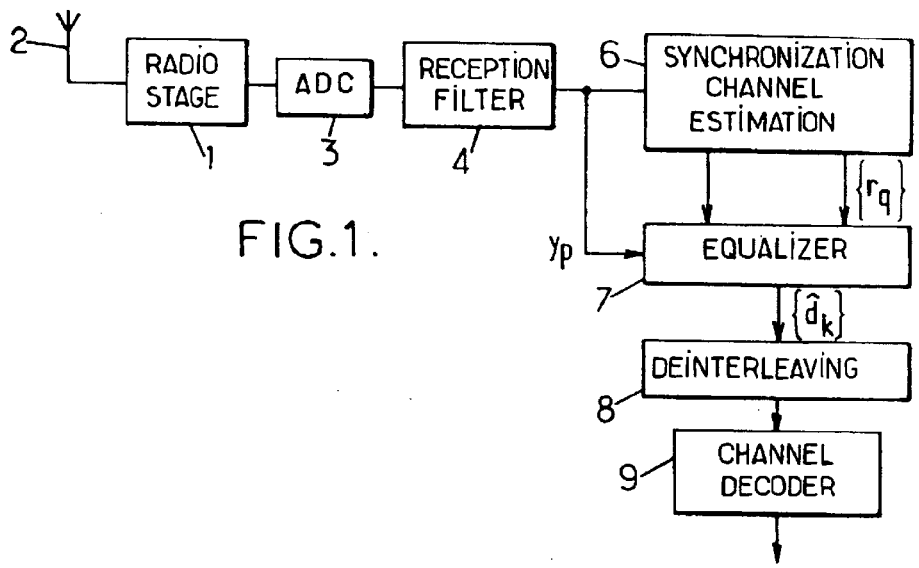
FIG. 1 is a block diagram of an example of a radio communications receiver according to the invention.

The receiver represented in FIG. 1 comprises a radio stage 1 which receives the signal picked up by antenna 2 and converts it to the baseband. The baseband signal is digitized by the analog-to-digital converter (ADC) 3 and fed to the reception filter 4. Filter 4 provides matched filtering with respect to the signal shaping by the transmitter. It delivers a digital signal at a rate of one complex sample per transmitted symbol.

The digital signal is fed to a demodulator comprising, on the one hand, a synchronization and channel estimation module 6 and, on the other hand, an equalizer 7.

The synchronization and channel estimation are, for example, performed conventionally by means of a synchronization sequence included by the transmitter in each signal frame. Detection of this sequence, known to the receiver, allows, on the one hand, the receiver to be synchronized relative to the temporal structure of the transmitted frames, and on the other to estimate the impulse response $r=(r_0, r_1, \ldots, r_w)$ of the channel carrying the transmitted frames. The impulse response calculated by module 6 is fed to the equalizer 7.

Figure 2:
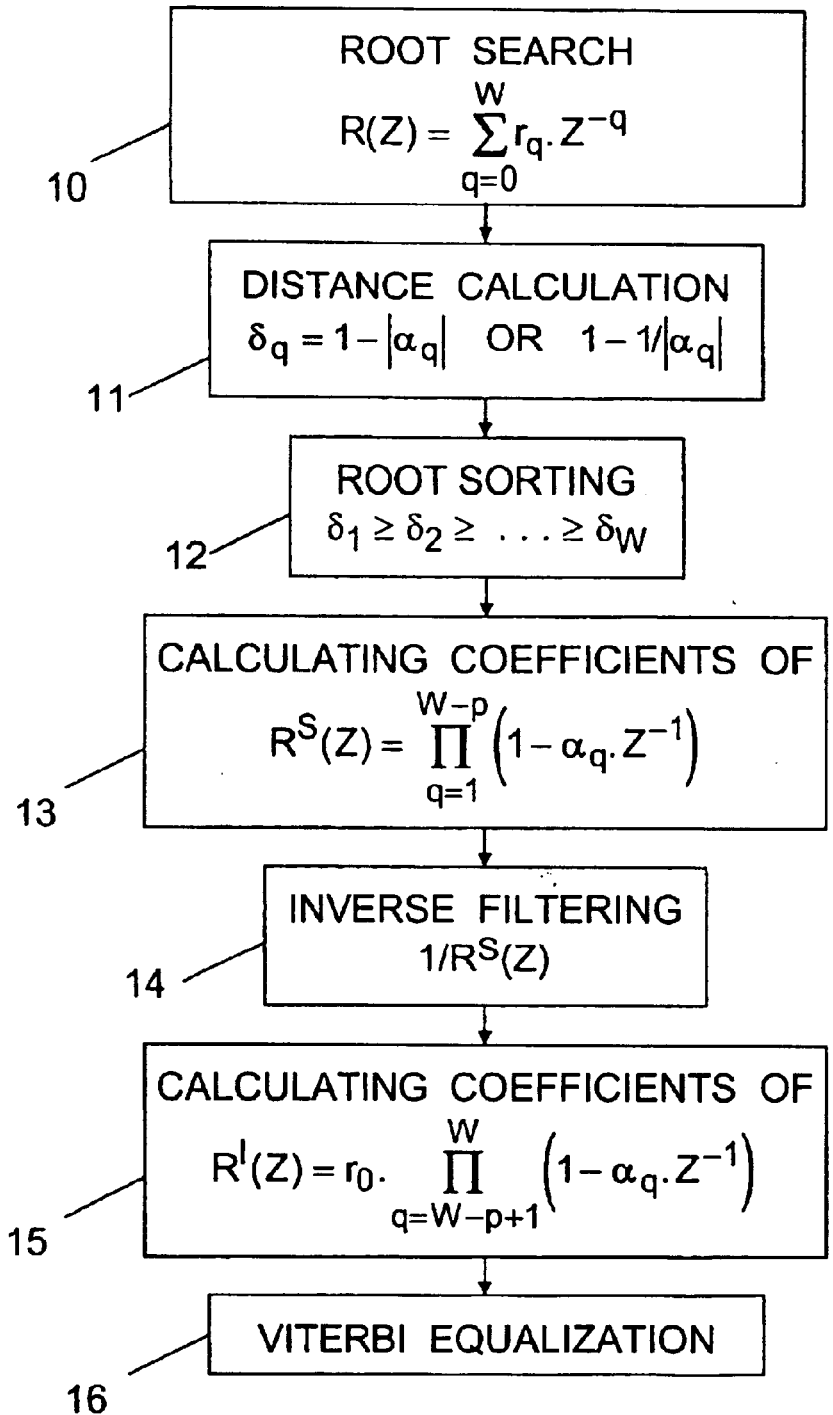
FIG. 2 is a flow chart showing an embodiment of the method according to the invention.

Equalizer 7 functions for example according to the flow chart shown in FIG. 2 to process each frame of the received signal, which are presented in the form of a vector $$Y = \begin{pmatrix} y_1 \\ \vdots \\ y_L \end{pmatrix},$$

with $L=n+W$, adopting the previous notation.

The channel estimation module 6 having supplied the $W+1$ complex coefficients $r_q$ of the estimated channel impulse response, the first step 10 consists of a search of the $W$ roots of the Z-transform of the impulse response, given by equation (5). Various conventional methods for the determination of complex roots of a polynomial can be employed at step 10. To this end, reference can be made to the work of E. DURAND: "Numerical Solutions of Algebraic Equations, Volume I, Equations of the Type $F(x)=0$", Editions Masson, 1960.

The $W$ roots thus found $\alpha_1, \alpha_2, \ldots, \alpha_W$ are then ordered to allow distribution into two sets, one containing the $W-p$ roots furthest from the unit circle, and the other the $p$ roots closest to the unit circle.

To this end, a distance $\delta_q$ is calculated at step 11 for each of the roots $\alpha_q$ ($1 \leq q \leq W$). This distance can be conveniently obtained as follows $$\delta_q = \begin{cases} 1 - |\alpha_q| & si |\alpha_q| \leq 1 \\ 1 - 1/|\alpha_q| & si |\alpha_q| > 1 \end{cases} \quad (7)$$

In step 12, the roots $a_q$ of the transfer function $R(Z)$ are sorted in order of decreasing distance: $\delta_1 \geq \delta_2 \ldots \geq \delta_W$. Then, the first $W-p$ roots which are the furthest from the unit circle, are separated from the remaining roots $\alpha_{w-p+1}, \ldots, \alpha_W$.

In step 13, the equalizer 7 develops a polynomial in $Z^{-1}$ defined by:

$$R^S(Z) = \prod_{q=1}^{W-p} (1 - \alpha_q \cdot Z^{-1}) = \sum_{q=0}^{W-p} s_q \cdot Z^{-q} \quad (8)$$

This allows the coefficients $s_q$ of the transfer function $R^S(Z)$ associated with the impulse response $s=(s_0, s_1, \ldots, s_{W-p})$ of a virtual channel to be determined, which corresponds to the estimated transmission channel with the contributions closest to the singularity zones removed.

We then proceed to a first equalization 14 which is effectively an inverse filtering approaching the transfer function $1/R^S(Z)$. Several implementations can be used to perform this inverse filtering. In particular, a zero-forcing equalization can be performed, as previously discussed. Regarding these methods, reference can be made to the work of J. G. Proakis: "Digital Communications", McGraw-Hill, $2^{nd}$ Edition, 1989.

The inverse filtering 14 produces an intermediate signal in the form of a vector $Y'$ of $L'=n+p$ samples $y'_1, \ldots, y'_L$. In the case of the zero-forcing method, the vector $Y'$ is obtained from the matrix equation:

$$Y'(A'^H A')^{-1} A'^H Y \quad (9)$$

In expression (9), $A'$ denotes a matrix having a Toeplitz structure with $n+W$ rows and $n+p$ columns, generated from the coefficients $s_q$ of the polynomial $R^S(Z)$:

$$A' = \begin{pmatrix} s_0 & 0 & 0 & \cdots & 0 \\ s_1 & s_0 & 0 & & \vdots \\ & s_1 & s_0 & \ddots & 0 \\ \vdots & & s_1 & \ddots & 0 \\ & & & \ddots & s_0 \\ s_{w-p} & & \vdots & & s_1 \\ 0 & s_{w-p} & & & \\ 0 & 0 & s_{w-p} & & \vdots \\ \vdots & & \ddots & \ddots & \\ 0 & \cdots & 0 & 0 & s_{w-p} \end{pmatrix} \quad (10)$$

The sorting of the roots am results in the eigenvalues of matrix $A'^H A'$ being relatively far removed from 0.

Alternatively, the inverse filtering can be achieved by cascading $W-p$ filtering cells, each corresponding to the inverse of a transfer function $R_q^s(Z) = 1 - \alpha_q Z^{-1}$, for $1 \leq q \leq W-p$. If $|\alpha q|=1$, the inverse filter of $R_q^s(Z)$ is unfeasible. If $|\alpha_q|<1$, we can develop $1/R_q^s(Z)$ in the form:

$$\frac{1}{R_q^S(Z)} = 1 + \alpha_q \cdot Z^{-1} + \alpha_q^2 \cdot Z^{-2} + \ldots + \alpha_q^m \cdot Z^{-m} + \ldots \quad (11)$$

Development (11) is causal and stable since the convergence domain contains the unit circle. The inverse filter cell can thus be generated in either a transverse or a recursive form.

If $\oplus \alpha_q| > 1$, then $1/R_q^s(Z)$ can be developed in the form:

$$\frac{1}{R_q^S(Z)} = -\alpha_q^{-1} \cdot Z \cdot (1 + \alpha_q^{-1} \cdot Z + \alpha_q^{-2} \cdot Z^2 + \ldots + \alpha_q^{-m} \cdot Z^m + \ldots) \quad (12)$$

Development (12) is anti-causal and stable. To perform the inverse filtering cell, the development (12) is truncated and an transverse filter implementation is adopted. The anti-causality results in a delay corresponding to the length of the retained response.

We note that developments (11) and (12) justify the unit circle distance criterion $\delta_q$ used according to relation (7).

In step 15, the equalizer 7 develops a polynomial of degree $p$ in $Z^{-1}$, whose roots correspond to the $p$ roots of $R(Z)$ closest to the unit circle, such that $R(Z)=R^S(Z).R^I(Z)$:

$$R^I(Z) = r_0 \cdot \prod_{q=W-p+1}^{W} (1 - \alpha_q \cdot Z^{-1}) = \sum_{q=0}^{p} t_q \cdot Z^{-q} \quad (13)$$

The complex coefficients $t_q$ define the impulse response of another virtual transmission channel, whose equalization by a zero-forcing method or the like would pose problems of noise enhancement.

The intermediate signal $Y'$ is then subjected to an equalization according to another method, based on the impulse response $t=(t^0, t_1 \ldots, t_p)$. This second equalization 16 can be conveniently performed by means of a Viterbi trellis (see above-cited article from G. D. Forney Jr., or the above-cited work of J. G. Proakis).

The second equalization stage 16 generates estimations $d_k$ of the symbols of the frame ($1 \leq k \leq n$). These estimations $d_k$ constituting the output of equalizer 7 can be input to a deinterleaving module 8 then to a channel decoder 9 which detects and/or corrects possible transmission errors.

Figure 3:
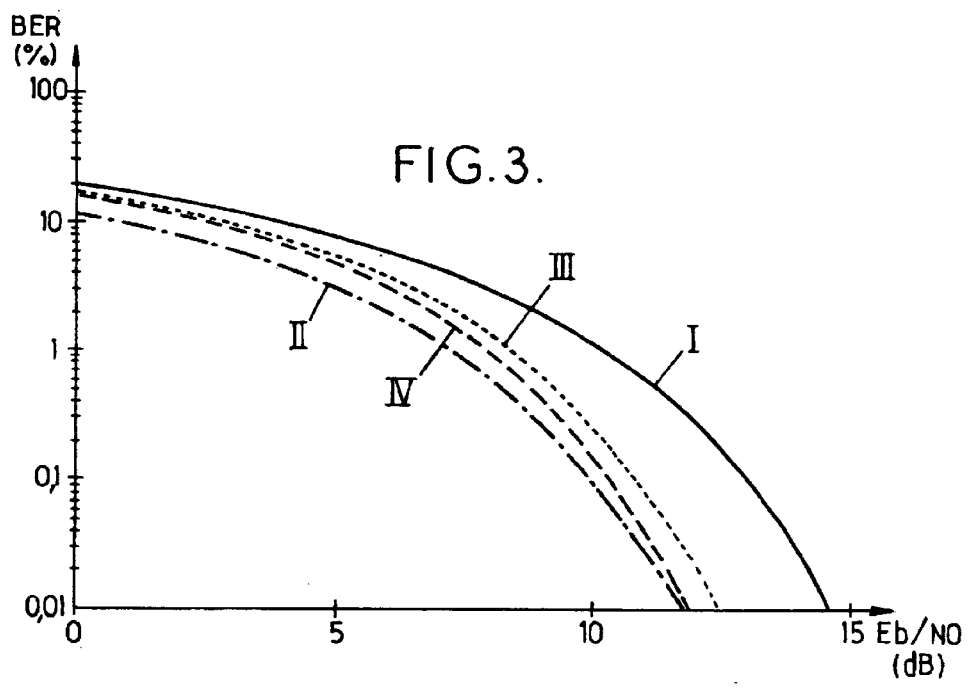
FIG. 3 is a diagram illustrating the performances

FIG. 3 illustrates the performance of the method in the case of the transmission of a signal frame according to the GSM European mobile telephone system, replacing the binary modulation of the GMSK type by an eight state phase modulation (8-PSK modulation). The impulse response was truncated at five bit time periods (W=4). FIG. 3 shows the dependence of the bit error rate (BER), expressed in %, on the ratio $E_b/N_0$ between the energy-per-bit and the spectral density of the noise, expressed in decibels (dB). The BER is that observed in the symbol estimations after deinterleaving and channel decoding carried out by a method conforming to those employed in the GSM standard. Curve I shows the results obtained by the pure zero-forcing method, i.e. in the limit case where p=0. Curve II shows the theoretical result that would be obtained by equalizing the channel purely with the Viterbi algorithm (limit case where p=W). In practice, the corresponding trellis should have $8^4$=4096 states, meaning that the Viterbi equalizer could not be realized using current technology. The difference between curves I and II illustrates the superiority of the Viterbi algorithm which produces maximum likelihood estimations.

Curves III and IV show the results obtained by the method according to the invention, in the cases where p=1 and p=2, respectively. The quite significant improvement already achieved for the value p=1 with respect to pure zero forcing can be seen.

By way of an example, equalization of a GSM signal frame by a pure Viterbi algorithm, under the conditions of FIG. 3, would require of the order of 8.45 million floating-point operations, i.e. around 1.83 Gflops, while the implementation of the present invention under the same conditions requires of the order of 19,000 floating-point operations ($\approx$4.2 Mflops) in the case of p=1, including searching the roots of R(Z) and 1/RS(Z) inverse filtering by the zero-forcing method. The number increases to the order of 129,000 operations ($\approx$28 Mflops) in the case of p=2, which remains compatible with the capacity of currently available digital signal processors (DSP).

What is claimed is:

1. A digital equalization method for estimating discrete information symbols from digital samples of a signal received over a transmission channel represented by a finite impulse response of W+1 coefficients, W being an integer greater than 1, comprising the steps of:

determining W roots in the complex plane of a Z-transform of the impulse response;

distributing the W roots into a first set of W-p roots and a second set of p roots, p being an integer greater than 0 and smaller than W, the roots of the second set being closer to a unit circle of the complex plane than those of the first set according to a determined distance criterion in the complex plane;

obtaining an intermediate signal by applying a first equalization method to the received signal based on a finite impulse response having a Z-transform consisting of a polynomial of degree W-p in $Z^{-1}$, having roots equal to the W-p roots of the first set; and obtaining estimations of the discrete information symbols by applying a second equalization method to the intermediate signal based on a finite impulse response having a Z-transform consisting of a polynomial of degree p in $Z^{-1}$, having roots equal to the p roots of the second set.

2. A method according to claim 1, wherein the first equalization method yields the intermediate signal in the form of a vector Y' of n+p samples obtained according to the relation:

$$Y'=(A'^H A')^{-1} A'^H Y$$

where n is an integer representing a number of the discrete information symbols, Y is a vector composed of n+W samples of the received signal, and A' is a matrix with n+W rows and n+p columns having a Toeplitz structure formed from the coefficients of said polynomial of degree W-p in $Z^{-1}$, and H denotes conjugate transpose.

3. A method according to claim 1, wherein the second equalization method comprises implementing a Viterbi algorithm.

4. A method according to claim 1, wherein the unit circle distance criterion, used to distribute the W roots $\alpha_1, \ldots, \alpha_W$ of the Z-transform of the channel impulse response into the first and second sets, is expressed as a distance $\delta_q$ of the form $\delta_q=1-|\alpha_q|$ if $|\alpha_q| \leq 1$, and of the form $\delta_q=1-1/|\alpha_q|$ if $|\alpha_q|>1$, for $1 \leq q \leq W$.

5. A radio communications receiver comprising:

conversion means to produce digital samples from a radio signal received over a transmission channel represented by a finite impulse response of W+1 coefficients, W being an integer greater than 1;

means for measuring the channel impulse response;

means for calculating W roots in a complex plane of the Z-transform of the impulse response;

means for distributing the W roots into a first set of W-p roots and a second set of p roots, p being an integer greater than 0 and smaller than W, the roots of the second set being closer to a unit circle of the complex plane than those of the first set according to a determined distance criterion in the complex plane;

a first equalization stage for producing an intermediate signal by applying a first equalization method to the received signal based on a finite impulse response having a Z-transform consisting of a polynomial of degree W-p in $Z^{-1}$, having roots equal to the W-p roots of the first set; and a second equalization stage for producing estimations of discrete symbols of a signal carried on the channel by applying a second equalization method to the intermediate signal based on a finite impulse response having a Z-transform consisting of a polynomial of degree p in $Z^{-1}$, having roots equal to the p roots of the second set.

6. A receiver according to claim 5, wherein the first equalization stage is arranged to yield the intermediate signal in the form of a vector Y' of n+p samples obtained according to the relation:

$$Y'=(A'^H A')^{-1} A'^H Y$$

where n is an integer representing a number of the discrete symbols, Y is a vector composed of n+W samples of the received signal, and A' is a matrix with n+W rows and n+p columns having a Toeplitz structure formed from the coefficients of said polynomial of degree W-p in $Z^{-1}$, and H denotes conjugate transpose.

7. A receiver according to claim 5, wherein the second equalization stage is arranged to implement a Viterbi algorithm.

8. A receiver according to claim 5, wherein the means for distributing the W roots $\alpha_1, \ldots, \alpha_W$ into the first and second sets make use of a unit circle distance criterion expressed as a distance $\delta_q$ of the form $\delta_q=1-|\alpha_q|$ if $|\alpha_q| \leq 1$, and of the form $\delta_q=1-1/|\alpha_q|$ if $|\alpha_q|>1$, for $1 \leq q \leq W$.

* * * * *